Aug. 7, 1928.
J. H. DAVIS ET AL
1,679,408
BRIQUETTING APPARATUS
Filed Aug. 2, 1926
4 Sheets-Sheet 1
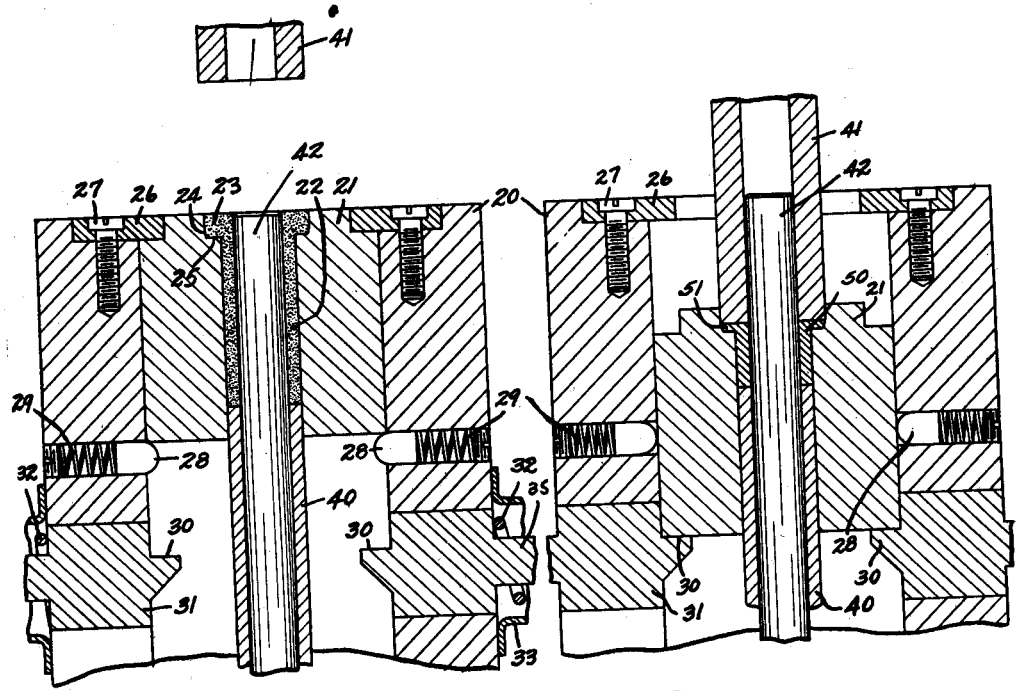
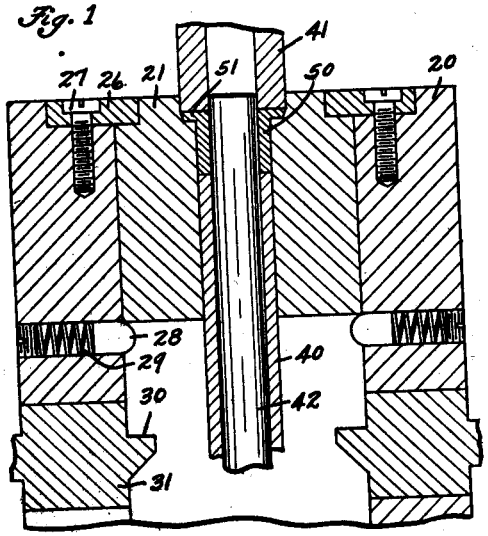
Fig. 3
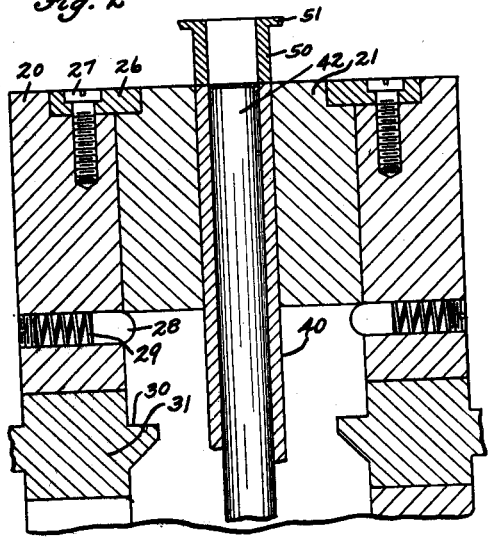
Fig. 4
Inventors
James H. Davis
Albert H. Valentine
By Spencer Small & Hardman
Their Attorneys

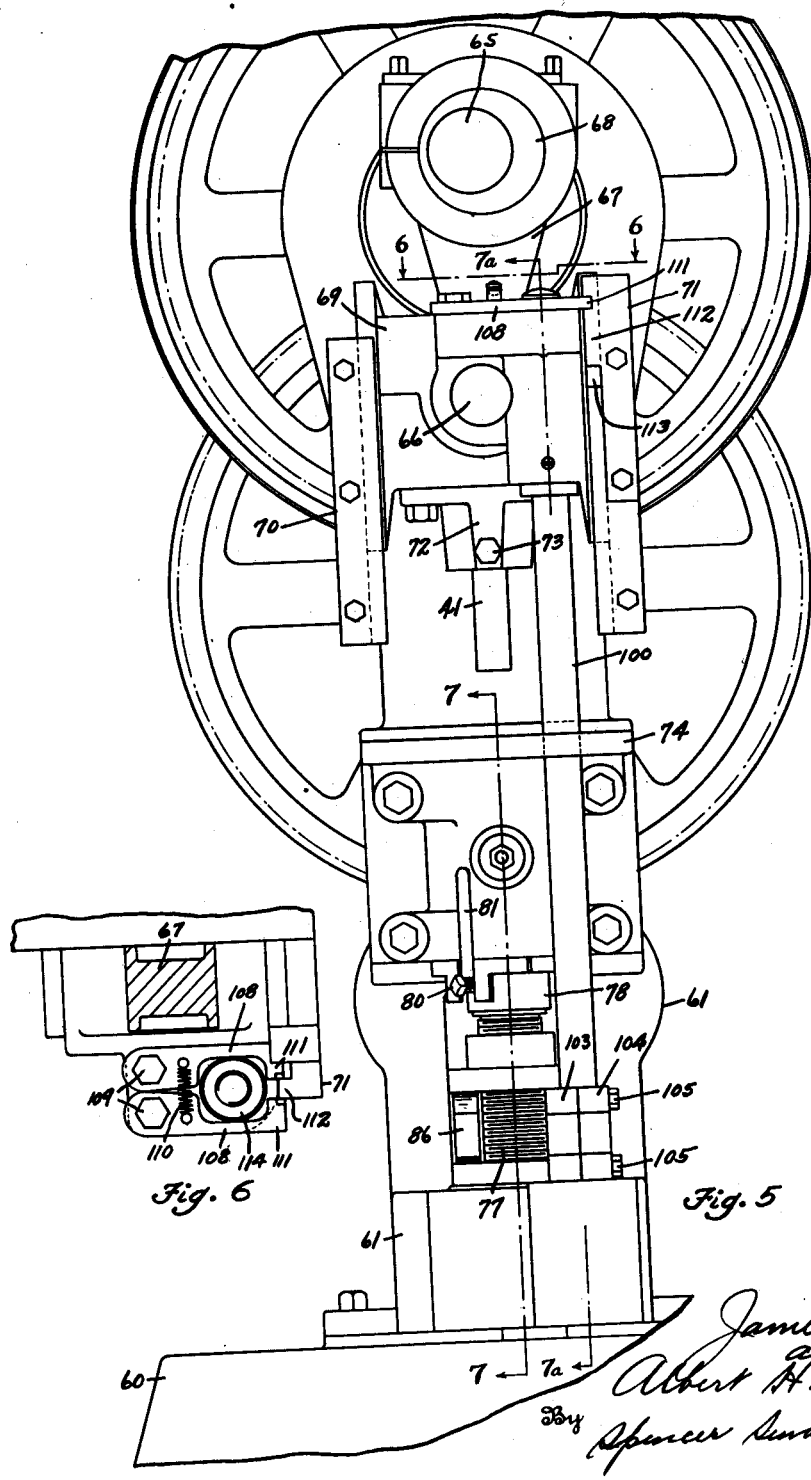

Aug. 7, 1928.

J. H. DAVIS ET AL 1,679,408

BRIQUETTING APPARATUS

Filed Aug. 2, 1926

Inventors
James H. Davis
Albert H. Valentine
By Spencer Small & Hardman
their Attorneys Patented Aug. 7, 1928.

1,679,408

UNITED STATES PATENT OFFICE.

JAMES H. DAVIS AND ALBERT H. VALENTINE, OF DAYTON, OHIO, ASSIGNORS TO MORAINE PRODUCTS COMPANY, OF DAYTON, OHIO, A CORPORATION OF OHIO.

BRIQUETTING APPARATUS.

Application filed August 2, 1926. Serial No. 126,369.

This invention relates to the manufacture of porous metal bodies, such as bearings, for shafts and the like. In the manufacture of porous metal bearings, finely-divided metals, such as copper and tin, are intimately mixed with graphite and other substances which tend to produce porosity. The mixture is then molded under pressure into the desired form and the articles, or briquettes, formed by molding, are sintered in a non-oxidizing atmosphere for a time and at a temperature sufficient to produce a union of the metallic particles without fusing them together in a solid mass. If copper and tin particles are used, the sintering temperature is higher than the melting point of tin, but lower than the melting point of copper. The result of this process is a porous metal body capable of absorbing a considerable proportion of its weight in oil. These bodies are particularly adapted for shaft bearings and other places where self-lubricating bearing surfaces are desired.

Porous metal objects are not readily machineable, but are sufficiently ductile to permit sizing them by drawing, or swedging, or rolling operations. The shape given to the briquette should be approximately the shape of the finished article, in order that the changes in size or shape required after the sintering operation will be reduced to the minimum.

There are many uses for a shaft bearing having a flange at one end in order that the bearing may receive end thrust, as well as support the shaft transversely thereof. The manufacture of porous metal bearings having flanges has been impractical on account of the difficulty in machining the exterior of the bearing in order to remove sufficient material therefrom to provide a flange. It is one of the objects of the present invention to provide apparatus for compressing powdered metals into the shape of a tubular body having a flange at one end in order to form a briquette which may be sintered to form a flanged bearing of porous metal.

Further objects and advantages of the present invention will be apparent from the following description, reference being had to the accompanying drawings, wherein a preferred form of the present invention is clearly shown.

In the drawings:

Figs. 1 to 4, inclusive, are longitudinal sectional views of apparatus for forming a tubular briquette having a flange. These views show parts of the apparatus in successive stages of operation.

Fig. 5 is an end view of the machine including the parts shown in Figs. 1 to 4;

Fig. 6, is a fragmentary sectional view on the line 6—6 of Fig. 5;

Figure 7:
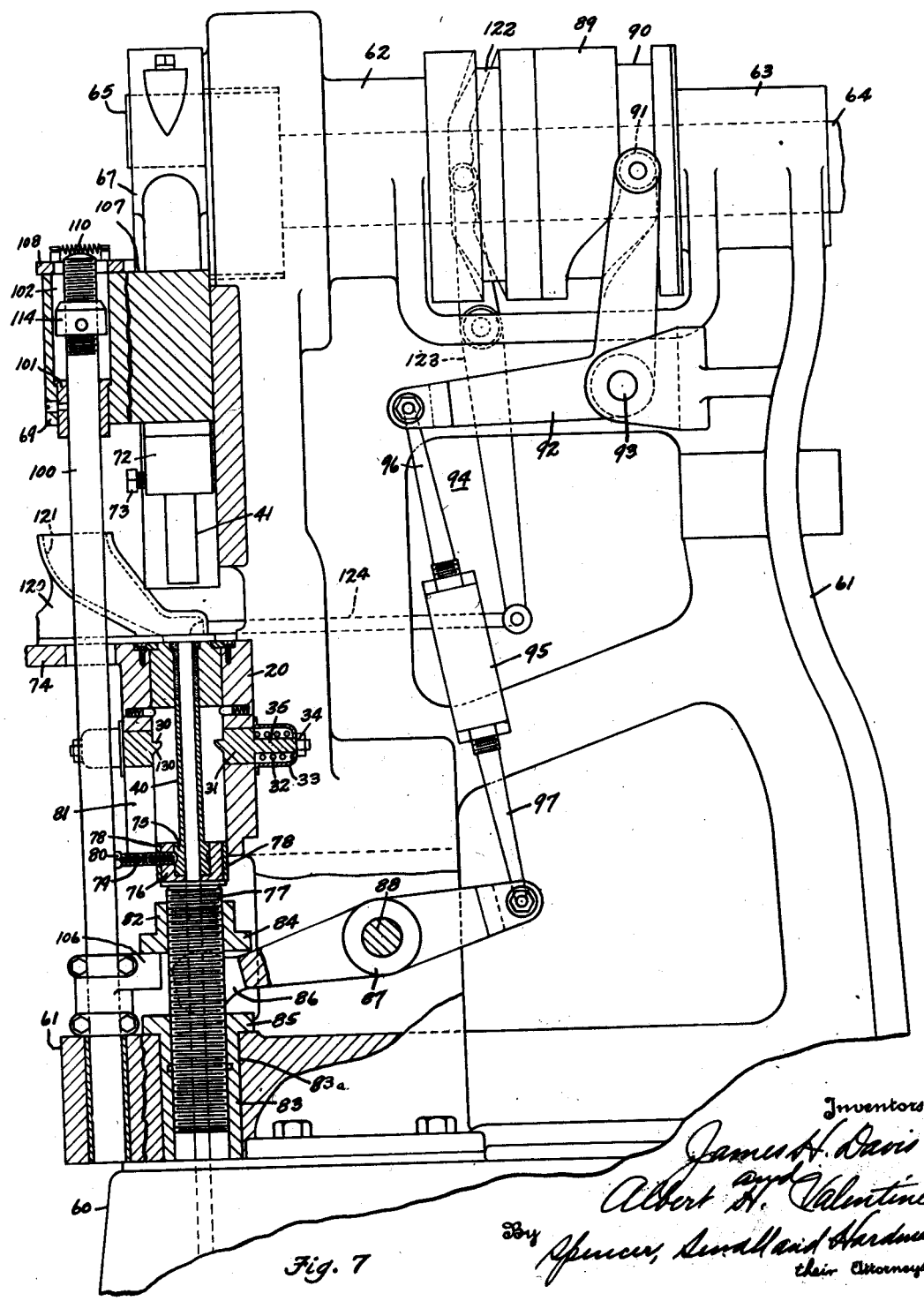
Fig. 7 is a side view of the machine shown in Fig. 5, this view being partly in section on the line 7—7 of Fig. 5, and partly in section on the line 7ᵃ—7ᵃ of Fig. 5.

Referring to the drawings, Fig. 1 designates a stationary guide 20 which supports for vertical sliding movement a die 21 having a bore 22, the diameter of which is substantially equal to the diameter of the main portion of the required bearing. The bore 22 merges into a bore 23, of larger diameter, for the purpose of providing the flange on the bearing. It will be noted that the side wall of the bore 23 includes a conical portion 24 which increases in diameter from the annular end wall 25 defining the recess. Upward motion of the die 21 is limited by a ring 26 which is attached by screws 27 to the guide 20. The die 21 is yieldingly maintained in the position shown in Fig. 1, by plungers 28 which are slidably supported by the guide 20, and which are urged inwardly toward the axis of the die 20 by springs 29. Downward movement of the die 21 is positively limited by its engagement with ledges 30 formed integrally with slides 31 which are yieldingly maintained in the position shown in Fig. 1, by springs 32 confined by spring cages 33 which are attached to the sides of the guide 20. Inward movement of the slides 31 is limited by nuts 34 which are threadedly connected with shanks 35 of the slides 31 which engage the outer ends of the spring cages 33.

The bore 22 of the guide 21 receives a tubular ram 40 and the bore 23 receives a tubular ram 41 which is aligned with the plunger 40. The rams 40 and 41 are provided with aligned central bores which are adapted to receive a pilot or mandrel 42 having a diameter substantially equal to the diameter of the finished bushing. Mandrel 42 is maintained stationary, and the rams 40 and 41 are operated by mechanism to be described later.

The use of the molding apparatus shown in Fig. 1 will now be described. The ram 40 cooperates with the die 21 to provide the bottom of a molding space included between the die 21 and the mandrel 42. This molding space is filled with a quantity of comminuted mixture of metals and other ingredients used to form the bushing. Then, while the ram 40 is maintained stationary and is solidly supported, the ram 41 is caused to descend to the position shown in Fig. 2. During the descent of the ram 41 it is received by the bore 23 which centers the ram 41 with respect to the die 21. The mandrel 42 is engaged by the ram 41. Thus the mandrel is maintained centrally within the bores of the die since portions of the mandrel which extend below and above the molding space are prevented from moving sidewise, due to the centering action of the rams. As the pressure upon the molding powder, particularly that within the bore 23, is increased, the springs 29 will finally be overcome so that the die 21 will move, with the ram 41, downwardly until the die 21 rests upon the ledges 30. Thus the molding powder introduced into the space between the mandrel 42 and the die 21 will be compressed into a briquette having the form indicated at 50 in Fig. 2. The height of the briquette will be about one-third the distance between the upper end of the ram 40 and the upper end of the die 21, as located in Fig. 1; and the flange 51 of the briquette will be about one-third the depth of the bore 23.

After the briquetting operation shown in Fig. 2, the rams 40 and 41 will be moved upwardly together, and will carry with them the die 21 which will move upwardly due, particularly, to the frictional engagement of the briquette 50 with the die. After the die has reached the position shown in Fig. 3, further upward movement will be stopped by its engagement with the ring 26. The ram 41 will continue to move upwardly until it has returned to the position shown in Fig. 1. The ram 40 will move upwardly from the position shown in Fig. 3 to that shown in Fig. 4, in which its upper end is substantially flush with the upper surface of the die 21. This movement of the ram 40 will cause the briquette 50 to be removed from the die, removal of the flange portion 51 being facilitated by the conical surface 24 of the bore 23. While the briquette 50 is located upon the upper end of the ram 40, as shown in Fig. 4, it may be removed from the molding apparatus by a suitable ejector which moves across the upper surface of the die 21. After ejecting the work the ram 40 is returned to the position shown in Fig. 1. During downward movement of the ram 40, the die 21 is maintained in the position shown in Fig. 1, due to the action of the spring-pressed plungers 28 which overcome the tendency of the ram 40 to drag the die 21 downwardly.

The briquettes 51 are subsequently packed in carbonizing boxes and isolated from the non-oxidizing atmosphere by suitable packing material, such as charcoal or charred bone. These boxes are placed in a sintering furnace in which the temperature is maintained for a time and at a temperature sufficient to produce a union between the metallic particles without fusing one of the materials, such as copper. After the carbonizing boxes have cooled sufficiently, the briquettes are removed, sized by suitable swedging or rolling processes, and then impregnated with lubricant. One example of manufacture of porous metal bodies is described in the patent to Harry M. Williams, No. 1,556,658, issued Oct. 13, 1925. The flange 51 will have been formed by the briquetting apparatus to substantially the required size. The flange may be ground slightly in order to render its side surfaces parallel and at right angles to the axis of the bushing, if necessary.

One form of machine for supporting and operating the briquetting apparatus described in Figs. 1 to 4 will now be described with reference to Figs. 5, 6 and 7. This machine includes a base 60 which supports a vertically-extending frame 61 providing bearings 62 and 63 for a power-driven shaft 64 carrying a crankpin 65. Crankpin 65 is connected with a wrist or cross head pin 66 by means including a connecting rod 67. An adjustable eccentric bushing 68 connects the rod 67 with the crankpin 65. The pin 66 is supported by a cross head 69 slidable between guides 70 and 71 supported by the frame 61. The lower end of the cross-head 69 supports a socket 72 for receiving the ram 41 which is secured in position by a screw 73.

The frame 61 supports the guide 20 and a table 74 which is preferably integral with the guide 20 and has its upper surface flush with the upper surface of the guide 20. The lower ram 40 is provided with a head 75 which is received by a socket member 76 provided on the upper end of a screw 77. Socket 76 is provided with bearing surfaces 78 which engage the interior side walls of the guide 20. In this way, the lower end of the ram 40 is maintained central with respect to the guide 20 and, hence, with respect to the bore 22 in the die 21. The ram 40 is secured within the recess 76 by a screw 79 having its head 80 extending through a notch 81. The screw 77 is engaged by nuts 82 and 83 having flanges 84 and 85, respectively, between which are located the ends 86 of a bifurcated lever 87 which is pivotally supported by a rod 88 mounted on frame 61. The nut 83 is guided for vertical movement by a bearing 83ª provided by the frame 61. Motion is imparted to the lever 87 by a drum cam 89 having a recess 90 which receives a roller 91 attached to a bell crank lever 92 which is pivoted at 93 upon the frame 61. The levers 92 and 87 are connected by a link 94 including a turnbuckle 95 having its opposite ends threaded to engage the right-hand and left-hand threads, respectively, provided on link portions 96 and 97. The cam 89 is operated by the shaft 64 and is so related to the crank 65 that the movements of the rams 41 and 40 will take place as described with reference to Figs. 1 to 4.

During the downward movement of the ram 41 to compress the metallic powder, the ram 40 is solidly supported directly by the frame 61, since the flange 85 of the nut 83 is then resting upon the frame. Motion of the ram 40 upwardly from the position shown in Fig. 3 to the position shown in Fig. 4 is assisted directly by the crosshead 69 by mechanism which includes a rod 100 which is supported at its lower end by the frame 61 and at its upper end by a bearing bushing 101 mounted within an aperture 102 in the crosshead 69. At its lower end the rod 100 is embraced by clamping members 103 and 104 which are secured by clamping screws 105. One or both of these members are provided with a lug 106 adapted to engage the underside of the nut 82. The upper surface 107 of the crosshead 69 supports levers 108, see Fig. 6, which are pivoted upon pins 109 attached to the crosshead. The levers are yieldingly urged toward the rod 100 by a spring 110 connecting the levers. In the position shown in Figs. 5, 6 and 7, the free ends 111 of the levers are maintained apart by a cam 112 which is attached to the stationary part of the mchine, such as the crosshead guide 71. The cam 112 has a pointed lower end 113. After the crosshead 69 has moved downwardly through a distance greater than necessary to bring the upper surface of the levers 108 below the under surfaces of a nut 114 attached to the rod 100, the free ends 111 of the levers 100 will have moved downwardly to clear the lower end 113 of the cam 112. Then the spring 110 will be released to move the levers 108 into engagement with the rod 100. During the movement of the ram 41 from the position shown in Fig. 2 to the position shown in Fig. 3, the levers 108 will have moved from a position below the under surface of the nut 114 to a position in which they engage the under surface of said nut. During motion of the ram 40 from the position show in Fig. 3 to the position shown in Fig. 4, the crosshead 69 will act through levers 108 and nut 114 to pull the rod 100 upwardly. Thus the crank 65 will assist the mechanism operated by the cam 89 in pulling the ram 40 upwardly in order to remove the briquette from the mold. After this has been accomplished, the levers 108 will be engaged by the beveled camming surface 113 of the cam 112, so that the rod 100 may be returned by the mechanism operated by cam 89, into the position shown in Fig. 7. Thus the rod 100 is disconnected from the crosshead to permit the return of the ram 40 to the position shown in Figs. 1 and 7 by the cam-operated mechanism.

The mandrel 42 extends through the plunger 41 and screw 77, and its lower end is supported by the base 60.

Metallic powders are introduced into the molding space through a funnel 120 which is pivotally supported by the table 74 and has its lower surfcce resting upon the table. The funnel 120 includes a passage 121, the lower end of which may be closed by the upper surface of the table 74, except when the lower end of passage 121 communicates with the molding space. The funnel 120 is operated by a cam 122, lever 123 and link 124, in such a manner that the lower end of the passage 121 will be brought into communication with the molding space and then the receptacle will be shaken in order that the predetermined quantity of molding powder which has been placed within it will be discharged into the molding space. Then the funnel is moved away from the path of motion of ram 41 before the briquetting operation. During movement of the lower end of the funnel 120 into alignment with the ram 41 and the molding space, the side surface of the lower end of the funnel will engage the briquette 50 while it is in the position shown in Fig. 4, in order to knock the briquette into a suitable receptacle (not shown).

It is apparent that the machine may be adjusted and certain parts may be substituted in order to adapt the machine for making bushings of different lengths and diameters. In some instances, certain adjustments may be made, causing the ram guide bearing 78 to move above the ledges 30 of the slides 31. To permit this, the under surfaces of the ledges are beveled at 130, in order that the sides 31 may be cammed outwardly in case it should be necessary to move the bearing 78 into engagement with or vertically above the ledges 30.

The upper surfaces of the ledges 30 are in the same horizontal plane. After the die 21 has been seated upon the ledges 30 the ram 41 may move downwardly a slight amount to complete the briquetting operation. If the engaging surfaces of the die 21 and guide 20 have become worn to an extent such as to permit cocking of the die within the guide, when the die 21 is pressed against the ledges 30 it will be forced into a position which is more nearly vertical. Thus the walls of the briquettes will be formed uniformly, although there may be sufficient clearance between the die 21 and the guide 20 to permit the axis of the die to be located slightly oblique to the axis of the mandrel 42.

The ledge or stop members 30 are removable so that there may be substituted therefor other members having ledges or die supporting portions differing from that which has been illustrated with respect to the vertical distance between the ledge surface and the body of the ledge member which engages and is supported by the guide 20. In this way the distance through which the die 21 may be moved is varied within certain limits.

Figure 8:
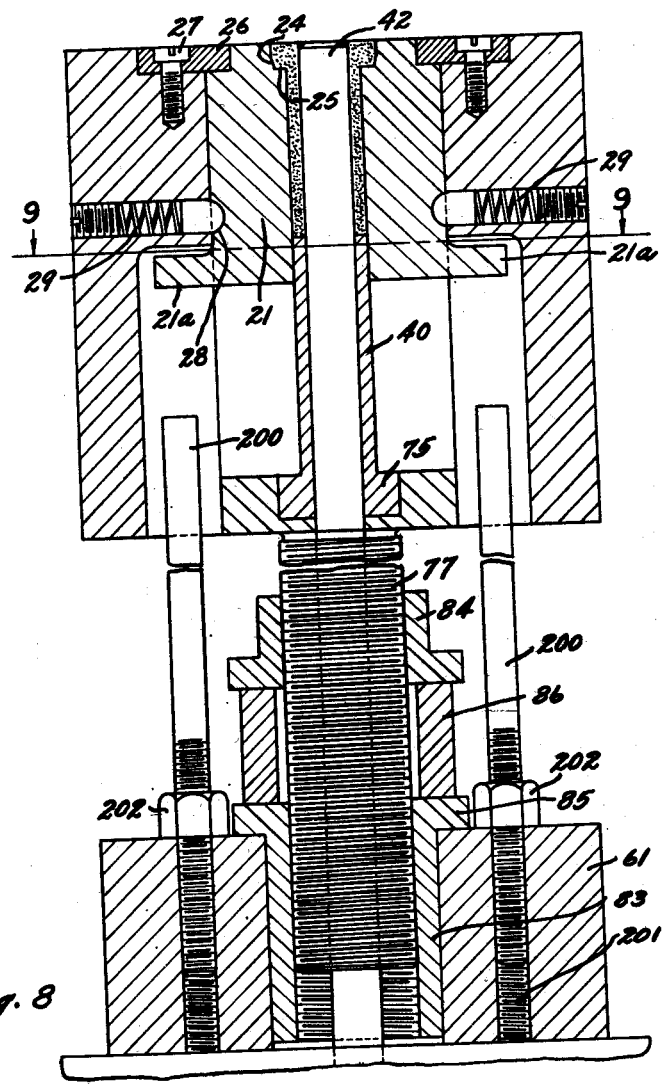
Fig. 8 is a vertical sectional view of a modified form of the briquetting apparatus.
Figure 9:
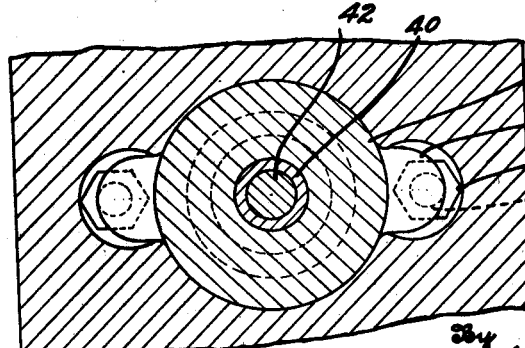
Fig. 9 is a sectional view on line 9—9 of Fig. 8.

In the form of the invention shown in Figs. 8 and 9, the die 21 is provided with horizontal extending lugs 21ª which engage stop rods 200 having threaded lower ends received by tapped holes 201 in the base 61. By turning the rods 200 the distance through which the die may be moved before striking the rods can be varied. The rods 200 are maintained in adjusted position by nuts 202.

While the form of embodiment of the present invention as herein disclosed, constitutes a preferred form, it is to be understood that other forms might be adopted, all coming within the scope of the claims which follow.

What is claimed is as follows:

1. Molding apparatus comprising, in combination, a die having molding space provided by bores of different diameters, tubular rams of different external diameters received by the respective bores, a mandrel received by central bores of the rams, and means for producing relative movement between the die and rams to compress material within the molding space, and for producing relative movement between the smaller ram and the die in order to eject the briquette from the die.

2. Molding apparatus comprising, in combination a die having molding space provided by bores of different diameters, tubular rams of different external diameters received by the respective bores, a mandrel received by central bores of the rams, means for solidly supporting one of the rams during the briquetting operation, and means for moving the other ram and the die toward the first-mentioned ram while the latter is stationary and for producing relative movement between the die and the rams in order to compress the material in the molding space, for producing relative movement between the die and the larger ram to permit ejection of the briquette, and for producing relative movement between the die and smaller ram in order to eject the briquette.

3. Molding apparatus comprising, in combination, a die having molding space provided by bores of different diameters, tubular rams of different external diameters received by the respective bores, a mandrel received by central bores of the rams, means for solidly supporting the smaller ram during the briquetting operation, means for moving the larger ram into the larger bore and causing the die to move relative to both rams in order to compress the material in the molding space, for moving the larger ram away from the die to permit ejection of the briquette, and for producing relative movement between the die and smaller ram in such direction as to eject the briquette.

4. Molding apparatus comprising, in combination, a vertically movable die having a molding space provided by vertically-aligned bores of different diameters, the larger bore being above the other, vertically-movable tubular rams of different external diameters received by the respective bores, a mandrel received by the central bores of the rams, a guide for the die, means for moving the larger ram into the larger bore and for causing the die to move relative to both rams in order to compress the material in the molding space, for withdrawing the larger ram, and for moving the smaller ram toward the larger ram, a stop limiting movement of the die toward the larger ram so that the smaller ram may be moved relative to the die to eject the briquette, and means for yieldingly maintaining the die in position within the guide.

5. Molding apparatus defined by claim 4 and including means tending to render the die vertical near the end of the briquetting operation.

6. Molding apparatus defined by claim 4 and including adjustable stops for limiting downward movement of the die.

In testimony whereof we hereto affix our signatures.

JAMES H. DAVIS.
ALBERT H. VALENTINE.